United States Patent

[11] 3,570,635

| [72] | Inventor | Tatsuya Takagi<br>No. 6-10, Araebisu-machi, Nishinomiya-shi, Hyogo-ken, Japan |
| --- | --- | --- |
| [21] | Appl. No. | 738,281 |
| [22] | Filed | June 19, 1968 |
| [45] | Patented | Mar. 16, 1971 |
| [32] | Priority | Dec. 11, 1967, Jan. 10, 1968, Mar. 27, 1968 |
| [33] | | Japan |
| [31] | | 42-79345, 43-1228 and 43-19435 |

[54] OIL-TYPE VIBRATION DAMPER
5 Claims, 17 Drawing Figs.

[52] U.S. Cl. .................................................. 188/88, 188/196
[51] Int. Cl. ........................................ F16f 9/348
[50] Field of Search .......................................... 188/88.503, 88.505, (BA), 96.5, 96.51

[56] References Cited
UNITED STATES PATENTS

| 2,244,501 | 6/1941 | Pierce | 188/88(.503) |
| --- | --- | --- | --- |
| 3,319,741 | 5/1967 | Hauck | 188/88(.503)X |
| 3,365,033 | 1/1968 | Willich | 188/88(.503) |

FOREIGN PATENTS

| 677,176 | 8/1952 | Great Britain | 188/88(.503) |
| --- | --- | --- | --- |

Primary Examiner—George E. A. Halvosa
Attorney—McGlew and Toren

ABSTRACT: An oil-type vibration damper includes a piston and a cylinder, and one or two sets of pressure control valves. One set of pressure control valves effects damping of vehicle vibrations above the supporting springs, and the other set of pressure control valves effects damping of vehicle vibrations below the supporting springs or one pressure control valve effects damping of said both vehicle vibrations. A switch valve mechanism detects changes in the frequency of the vibrations to automatically act on one or the two sets of pressure control valves in accordance with the frequency of the vibrations.

INVENTOR
TATSUYA TAKAGI

BY
*McGlew & Toren*
ATTORNEYS

INVENTOR
TATSUYA TAKAGI

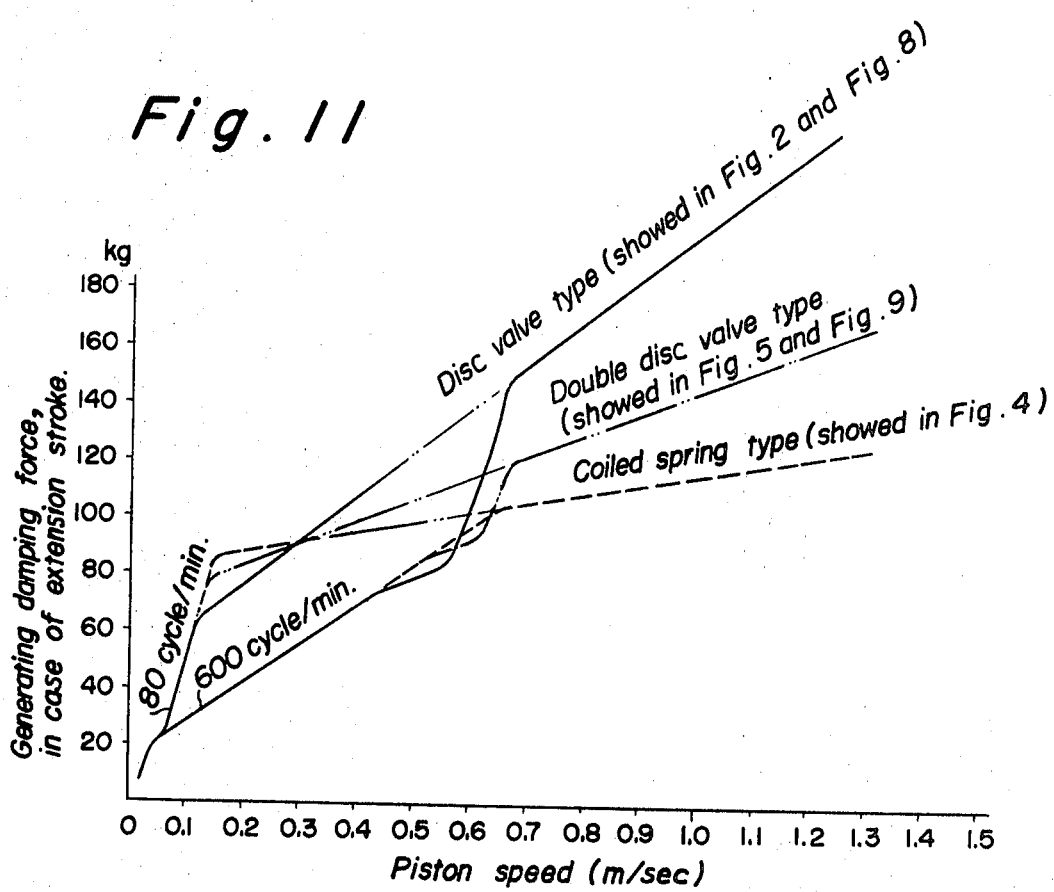

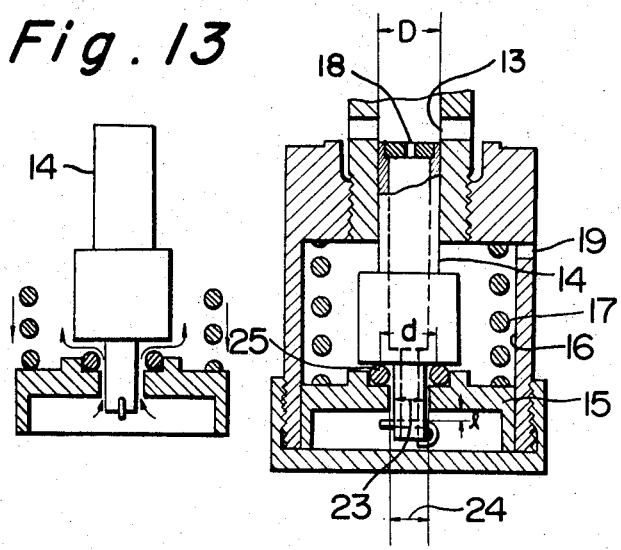
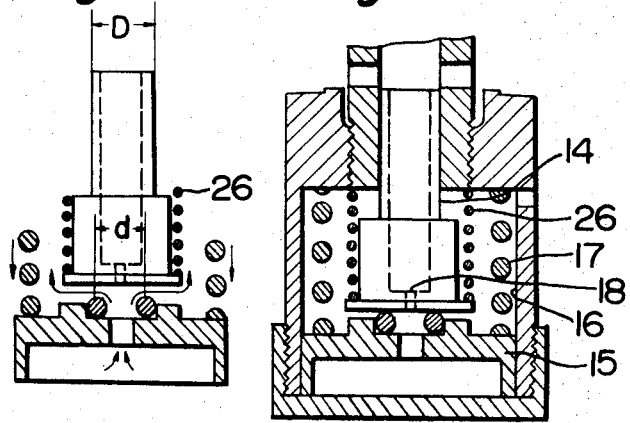

Characteristic curves of the oildampers showed in Fig.12 and Fig.14.

OIL-TYPE VIBRATION DAMPER

BACKGROUND OF THE INVENTION

Suspension systems for motor vehicles generally include chassis or support springs interposed between the wheels and the body. The wheels are equipped with tires which constitute resilient members. Accordingly, the motor vehicles are subjected to two different systems of vibration, one including natural vibrations above the springs, hereinafter referred to as primary vibrations, and the other including natural vibrations below the springs, hereinafter referred to as secondary vibrations.

In most passenger motor vehicles, the primary vibration frequency is about 80 cycles per minute, ranging from 40 to 120 cycles per minute, and the secondary vibration frequency is about 600 cycles per minute, ranging from 400 to 1000 cycles per minute. An oil damper or shock absorber is mounted between the wheels and the body to effect damping of the two vibration systems. However, since it is very difficult for a single oil damper or shock absorber to effect satisfactory damping of the two vibration systems vibrating at different frequencies, the present practice is to use an oil damper or shock absorber designed as a compromise of the different requirements of the two different frequency vibration systems.

When a motor vehicle operates on regular roads, such as roads having fairly smooth pavement, the use of an oil damper or shock absorber having a low damping force is conducive to increased riding comfort, because such an oil damper or shock absorber prevents transmission of impacts from the road resulting in vibrations below the springs. However, such an oil damper or shock absorber will cause jolting and tossing when the vehicle travels on bad roads, such as roads which are unpaved or have very poor pavement, and such jolting and tossing interfere with driving of the vehicle.

On the other hand, if the oil damper or shock absorber has an excessively high damping force when the vehicle is subjected to vibrations below the springs, as on bad roads, the wheels cannot accommodate themselves to irregularities of the road's surface and the vehicle cannot travel smoothly. The lack of sufficiently high damping forces under such conditions results in the development of resonance below the springs and insufficient contact of the wheels with the road surface. Since the solutions to these problems are contradictory to each other, it is impossible to obviate all of the problems, by means of known oil dampers or shock absorbers, without compromising with respect to the factors involved.

SUMMARY OF THE INVENTION

This invention relates to motor vehicle oil dampers or shock absorbers and, more particularly, to an improved oil damper or chock absorber having damping characteristics which vary with the frequency of the vibrations to be damped.

In accordance with the invention, an oil damper or shock absorber of the piston-cylinder-type is provided with two sets of pressure control valves therein. One set of pressure control valves, hereinafter referred to as primary valves, is adapted to provide damping force characteristics best suited to accommodate vibrations above the chassis springs. The other set of pressure control valves, hereinafter referred to as secondary valves, is adapted to provide damping force characteristics best suited to dampen vibrations occurring below the springs. A switch valve mechanism is provided for sensing a change in the frequency of the vibrations, and automatically switches the pressure control valves in a manner such that the primary valve or valves are actuated responsive to primary vibrations and the secondary valve or valves are actuated responsive to secondary vibrations.

An object of the present invention is to provide an oil damper or shock absorber capable of effecting damping of both primary vibrations and secondary vibrations.

Another object of the invention is to provide such an oil damper or shock absorber including a switch valve mechanism which senses a change in the frequency of vibration.

A further object of the invention is to provide such an oil damper or shock absorber in which the switch valve mechanism automatically switches the pressure control valves in a manner such that a primary valve is operative responsive to primary vibrations and a secondary valve is operative responsive to secondary vibrations.

Another object of the invention is to provide such an oil damper or shock absorber having one pressure control valve which effects damping of said both vibrations.

BRIEF DESCRIPTION OF THE DRAWINGS

For an understanding of the principles of the invention, reference is made to the following description of typical embodiments thereof as illustrated in the accompanying drawings.

In the Drawings

FIGS. 4—9a are views, similar to FIG. 2, illustrating alternative embodiments of the invention;

FIG. 11 is a diagram graphically illustrating the damping characteristics of five embodiments of the invention;

FIGS. 12—15 are views, similar to FIG. 2, illustrating two further embodiments of the invention including preferred forms of switch valves.

DESCRIPTION OF THE PREFERRED EMBODIMENTS

Figure 1:
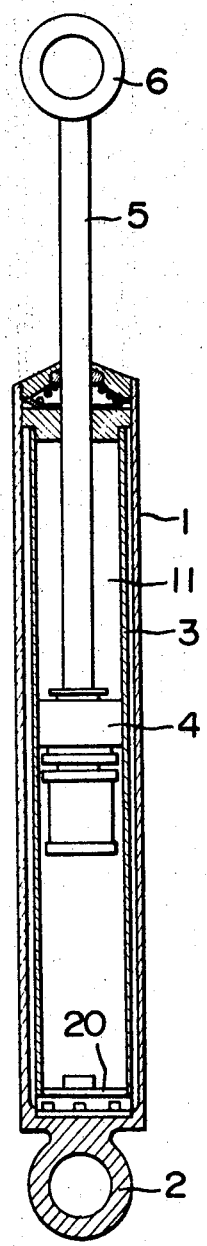
FIG. 1 is a somewhat schematic longitudinal sectional view of one damper embodying the invention.

Referring to the drawings, FIG. 1 illustrates one example of an oil damper or shock absorber, embodying the invention, and which is of the dual action type developing a damping force during both the extension stroke and the compression stroke. The oil damper shown in FIG. 1 comprises an outer shell 1 having a lower end 2 arranged for attachment to a vehicle axle. Within shell 1, there is a pressure tube 3 slidable receiving a piston 4 connected to a piston rod 5 extending through the upper cover of outer shell 1 in fluidtight relation and having an upper end 6 arranged for connection to the vehicle body.

Figure 2:
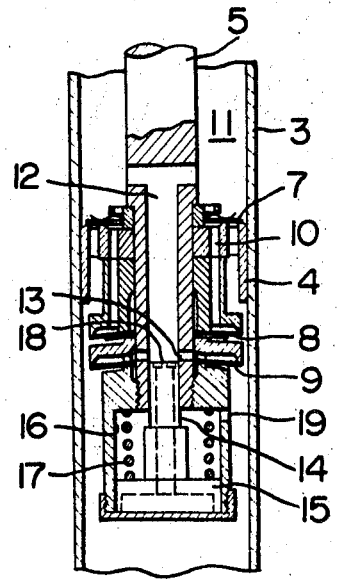
FIG. 2 is a partial central longitudinal sectional view of one form of piston constituting an essential element of an oil damper or shock absorber in accordance with the invention.

As shown in FIG. 2, a one-way valve 7 is arranged on the upper surface of piston 4 and permits oil to move upwardly only. Piston 4 also has incorporated therewith a primary valve 8 and a secondary valve 9 which permit oil to move downwardly only. Primary valve 8 communicates with the upper oil chamber 11, above piston 4, through oil passages 10 formed through the piston. Secondary valve 9 communicates with upper oil chamber 11 through axial passage 12, in piston rod 5, and radial passages 13.

A plunger-type switch valve 14 is provided for opening and closing secondary valve 9, and includes a valve-operating piston 15, a cylinder 16 slidably enclosing piston 15 and a piston biasing spring 17. Normally, switch valve 14 is biased to its lower position by spring 17 so as to leave radial ducts 13 open and communicating with axial bore or passage 12. Switch valve 14 is formed with a throttling duct 18 extending axially thereof to interconnect upper oil chamber 11, through passage 12 in piston rod 5, with a chamber beneath piston 15. Cylinder 16 is formed with an oil discharge port 19 above piston 15, and the same results can be attained by throttling flow of oil through discharge port 19 as can be obtained by throttling flow of oil through throttling duct 18.

Secondary valve 9 has lesser damping force characteristics than does primary valve 8, with the characteristic of secondary valve 9 generally being in the range of from one-half to three quarters of the characteristic or primary valve 8. Switch valve 14 is adapted to keep secondary valve 9 open when the oil damper or shock absorber is stationary, but closes secondary valve 9 when the oil damper or shock absorber is subjected to vibratory external forces of the primary vibration, or low frequency, type. Switch valve 14 opens secondary valve 9 when the oil damper or shock absorber is subjected to vibratory external forces of the secondary vibration, or high frequency, type.

Figure 3:
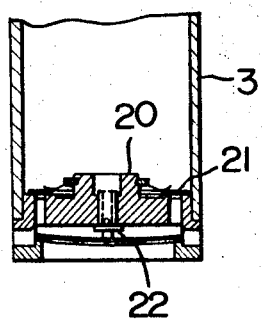
FIG. 3 is an axial sectional view of a pressure valve, for the compression stroke of the oil damper, positioned at the bottom end of the cylinder of the oil damper.

The lower end of pressure tube 3 is provided with a dual action valve 20 of a conventional type. As shown in FIG. 3, valve 20 includes a one-way valve 21 which permits oil to flow upwardly only, and a pressure control valve 22 which permits oil to flow downwardly only. During a compression stroke, valve 22 develops a damping force as a greater length of piston rod 5 enters into pressure tube 3. During extension, a quantity of oil corresponding to the upward movement of piston rod 5 flows through valve 21 into the chamber beneath piston 4.

In the extension stroke of the oil damper or shock absorber, one-way valve 7 is closed and oil pressure in upper oil chamber 11 increases as piston 4 moves upwardly. Secondary valve 9, which is operable by relatively low pressure, is opened and develops a small damping force during the time that primary valve 8 remains closed. If the vibratory external forces have a high frequency, constituting a secondary vibration, the throttling effect of duct 18 prevents piston 15 moving upwardly, so that switch valve 14 maintains radial ducts 13 open. Thus, secondary valve 9 operates and develops a small damping force during a secondary or high frequency vibration.

When the vibratory external forces to which the oil damper is subjected have a low frequency or primary vibration, a larger quantity of oil flow through throttle duct 18 into the chamber below piston 15, causing switch valve 14 to move upwardly to close radial ducts 13 and thus render secondary valve 9 ineffective. Under these conditions, primary valve 8 opens during the extension stroke.

The oil damper operates in the described manner during each cycle of vibration, whether at low frequency or at high frequency, and switch valve 14 is restored to its initial position by spring 17, at the end of each cycle, to prepare for the succeeding cycle.

Figure 4:
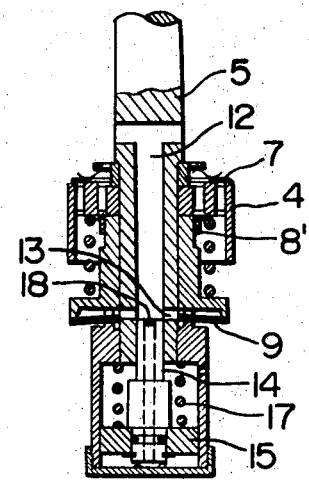
Figure 5:
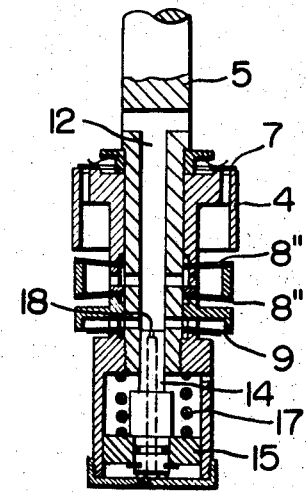

Referring now to the embodiments of the invention illustrated in FIGS. 4 through 9b, in the embodiment shown in FIG. 4, the primary valve is a coil spring biased valve 8' which is an annular member having an angle cross section. In the embodiment of FIG. 5, the primary valve is constituted by a dual disc valve 8" having both axial and radial flow passages.

Figure 6:
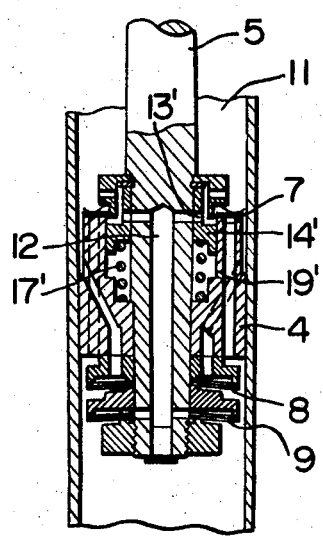

In the embodiment of the invention shown in FIG. 6, switch valve 14' controlling secondary valve 9 is mounted in the upper portion of piston 4, and controls radial ducts 13'. Discharge port 19' acts as a throttling port in order to provide a time lag in operation of switch valve 14'.

Figure 7:
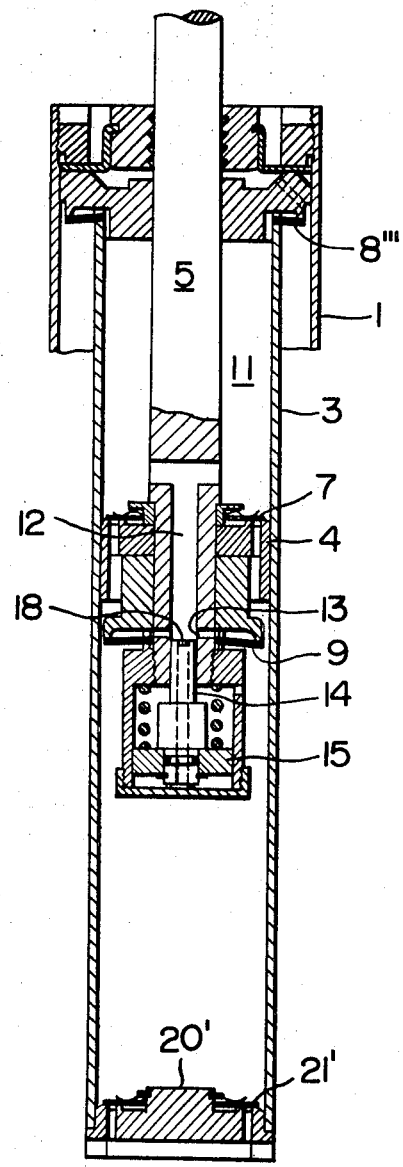

In the embodiment shown in FIG. 7, primary valve 8''' is mounted in the upper end of the cylinder or tube 3. This embodiment of the invention does not require a pressure valve mounted in the bottom of pressure tube 3, and it will be noted that valve 20' includes only a suction valve 21'. In the compression stroke of the oil damper or shock absorber, the primary valve 8''' in the upper end of cylinder 3 operates to develop a damping force as piston rod 5 moves downwardly in cylinder 3.

Figure 8:
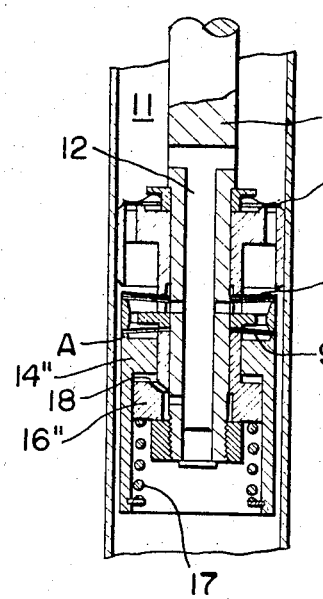
Figure 9A:
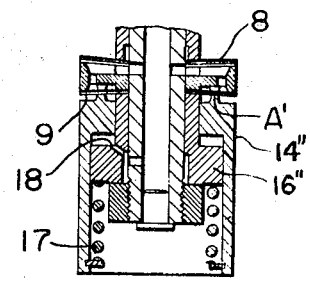

In the embodiments of the invention shown in FIGS. 8 and 9a, respective pusher members A and A' are disposed beneath secondary valve 9 for closing valve 9 during operation of oil damper. Floating cylinders 14" move the pusher members upwardly and downwardly. Each floating cylinder is in engagement with a piston 16" secured to piston rod 5 and communication with the upper oil chamber 11 is maintained through throttling duct 18. The floating cylinders 14" are pushed upwardly by the oil pressure in upper oil chamber 11, thereby to close secondary valves 9, by the pressure exerted between each floating cylinder and its associated piston 16". When the oil pressure in upper oil chamber 11 decreases, as in the stationary position of the oil damper, or during a compression stroke, springs 17 move pistons 16" upwardly relative to floating cylinders 14" to provide for opening of secondary valves 9.

In the embodiment of the invention shown in FIG. 8, secondary valve 9 is closed by pusher member A engaging the outer periphery of secondary valve 9. The pusher member A', shown in FIG. 9a, is so constructed that it engages the portion of disc valve 9 slightly inwardly from the outer periphery thereof. Thereby, disc valve 9 can have a higher spring constant, improving its characteristics. This arrangement provides for secondary valve 9 to open, when the pressure is excessively high, even after the valve has been closed by pusher member A'. In this manner, the curve representing the damping force-speed characteristics can be made to have a gentler slope.

Figure 10:
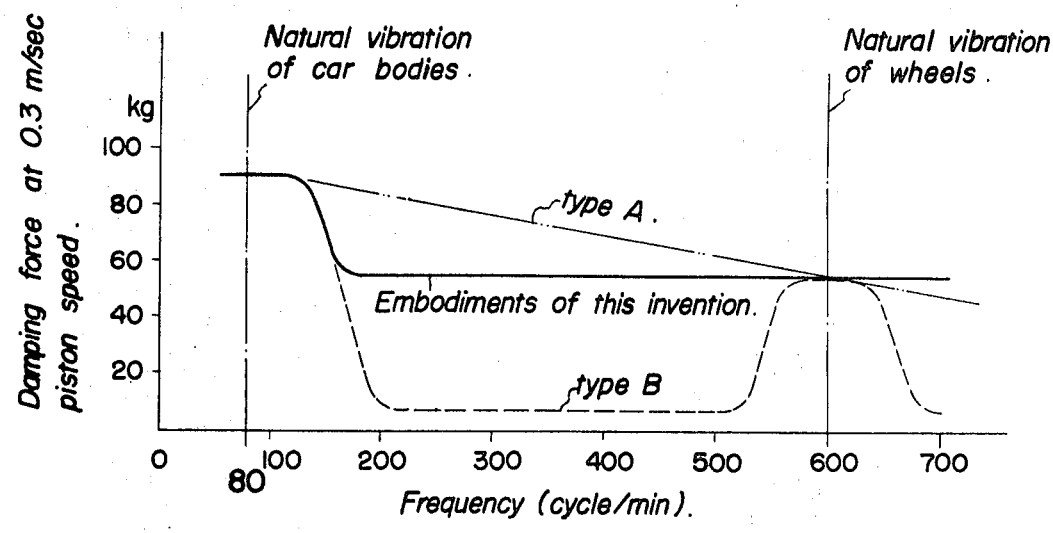
FIG. 10 is a diagram graphically illustrating the principles on which the present invention is based.

FIG. 10 illustrates the manner in which a damping force can be varied in accordance with the frequency of vibrations and with the piston speed remaining constant. An oil damper having the broken line characteristic B develops a damping force only when either a primary vibration or the secondary vibrations are present. However, in actual operation, the vehicle wheels move while accommodating irregularities of the road surface, with the result that the vibrations to which the oil damper is subjected include vibrations of an intermediate frequency range as well as the two frequency ranges mentioned. The vibrations of the intermediate frequency range have the secondary vibrations superimposed thereon. Thus, an oil damper having the characteristic B does not develop a damping force in the intermediate frequency range, and thereby has the disadvantage that it cannot damp the secondary frequency superimposed on vibrations in the intermediate frequency range. Thus, an oil damper having the characteristic B is not desirable.

An oil damper having the dot and dash line characteristic A, and as shown in U.S. Pat. Application Ser. No. 557,519, now U.S. Pat. No. 3,379,286, is also not desirable. Such an oil damper develops a very high damping force when subjected to a vibration of, for example, 300 cycles per minute, so that is has an overdamping effect on secondary vibrations superposed on the 300 cycle vibration, thus reducing riding comfort.

The technical concept underlying the present invention, as shown in FIG. 10, is that the oil damper develops, in the intermediate frequency range, an amount of damping force sufficient to accommodate secondary vibrations which may be superposed on vibrations in the intermediate frequency range. Thus, an oil damper embodying the present invention is free from the disadvantages of oil dampers having the characteristics A and B.

FIG. 11 illustrates the damping force-piston speed characteristics of five embodiments of the oil damper in accordance with the present invention. In a conventional suspension system, the primary vibration does not produce a piston speed higher than 0.4 meter per second. Accordingly, there are almost no appreciable differences in the results attained by the five embodiments illustrated in FIG. 11.

However, secondary vibrations produce a piston speed of 1.5 to 2.0 meters per second. When the piston speed is particularly high, it may become impossible for the throttle duct 18, of the type shown in FIG. 2, to cause switch valve 14 to operate with a proper time lag, due to the high oil pressure.

More specifically, the amount of oil flowing through throttle duct 18 into the chamber beneath the piston 15 during the extension stroke would become larger than the amount of oil returning from chamber 15 through throttle duct 18 in the compression stroke. Thus, the accumulation of oil beneath piston 15 during repeating secondary vibrations would lift the piston to close secondary valve 9. As graphically illustrated in FIG. 11, secondary valve 9 would be closed even if the oil damper is subjected to secondary vibrations when the piston speed exceeds 0.6 meter per second, thus leaving only primary valve 8 operative.

It is therefore necessary that the primary valve accommodate secondary vibrations, in order that the oil damper may operate satisfactorily at high piston speeds. However, the use of a coil spring biased valve as the primary valve, as shown in FIG. 4, makes it impossible to increase the degree of slope of the characteristic curve, while the use of a conventional disc-type valve, as shown in FIGS. 2 and 8, makes it impossible to reduce the angle of slope of the characteristic curve. For this reason, a double disc valve, such as shown in FIGS. 5 and 9a, is used as the primary valve. This type of primary valve makes it possible to design the oil damper embodying the invention so that the damping force-piston speed characteristic may be selected to any curve or slope as desired, thus contributing to the advantages of the present invention.

In the embodiment of the invention shown in FIG. 2, piston rod 5 and cylinder 16 for piston 15 are fixedly interconnected. It is difficult to finish machine the two members in such a manner that the axial duct in piston 5 is accurately concentric with cylinder 16. If there is misalignment, switch valve 14 may not operate satisfactorily.

Furthermore, when piston 15 is biased by spring 17 to its lower position, oil in the chamber beneath piston 15 must flow through throttle duct 18 to the upper chamber 11. If the piston speed resulting from the secondary vibration were high, the pressure of oil would be increased and the quantity of oil flowing through duct 18 into the chamber below piston 15 would become larger than the quantity of oil flowing from the chamber below piston 15 through duct 18 into the upper chamber when piston 15 is biased back to its lower position. If vibrations were continued in this condition, the position of piston 15 would become higher than it should be, and secondary valve 9 might be closed by the piston 15 in the abnormally higher position of the latter.

In the embodiment of the invention shown in FIGS. 12 and 13, these disadvantages are obviated. In this embodiment of the invention, switch valve 14 and piston 15 are not fixedly interconnected but may move relative to each other. Thus, the two elements are assembled in such a manner that lower end portion 23 of valve 14 extends, with a large clearance, through opening 24 in piston 15. This lower end portion 23 not only serves concurrently as an oil flow passage interconnecting the space beneath piston 15 with the space above switch valve 14, but also can move, relative to piston 15, through the distance 1. An elastic O-ring 25 is interposed between valve 14 and piston 15, as shown, in order to provide a fluidtight seal between these parts. The diameter D of switch valve 14 is larger than the effective pressure bearing diameter $d$ of the O-ring. It will be clear that the described construction can obviate the disadvantages of misalignment of the axial duct in piston rod 5 and the centerline of cylinder 16.

The manner of operation of this embodiment follows from the structure described. The pressure of oil in upper oil chamber 11 acts on the diameter D to move switch valve 14 downwardly, while the pressure of oil flowing through throttle duct 18 into the chamber beneath the piston 15 acts on the diameter $d$ to move switch valve 14 upwardly. Since diameter D is larger than diameter $d$, switch valve 14 moves downwardly and pushes O-ring 25 into bearing engagement with piston 15. This is also the case when the flow of oil through discharge port 19 is throttled, instead of the flow of oil through intake throttle 18 being throttled. When the flow of oil through intake duct 18 is throttled, the pressure of oil in the chamber beneath piston 15 becomes less than the pressure of oil in upper oil chamber 11, and this assures that the operation of the switch valve 14 is performed positively.

When external forces cause the oil damper to perform a compression stroke, spring 17 biases piston 15 to restore it to its original position, as the pressure of oil in the upper oil chamber decreases until it reaches zero. As the oil pressure is removed therefrom, switch valve 14 is released from engagement with piston 15, so that the two members separate from each other through their limit of relative movement, thereby facilitating restoration of piston 15 to its original position. The second disadvantage described thus can be obviated.

FIGS. 14 and 15 illustrate a variation of the embodiment shown in FIG. 12, in which switch valve 14 is movable relative to piston 15. In FIG. 14, a switch spring 26 is provided to insure members 14 and 15 moving simultaneously. The advantage of this variation of the embodiment of FIG. 12 lies in the fact that a slight increase in the strength of spring 26 results in an increase in the oil pressure when switch valve 14 is opened thereby permitting restriction of the speed at which piston 15 is restored to its original position. In this connection, it is not required to increase, more than necessary, the speed at which piston 15 is restored to its original position as, if the restoring speed is too high, squeaks may develop. FIG. 15 illustrates the arrangement of FIG. 14 when the pressure beneath piston 15 is greater than that above valve 14.

Figure 9B:
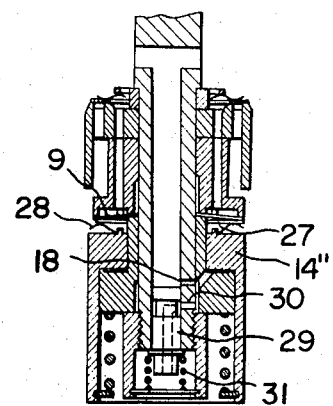
FIG. 9b is a view showing only one pressure control valve being used and suitable for both the primary vibrations and the secondary vibrations.

With respect to the previously described embodiment shown in FIG. 9a, it should be noted that this can provide an increased riding comfort, which is characteristic of the present invention even if primary valve 8 is omitted and only secondary valve 9 provided in the manner shown in FIG. 9b. In this case, an additional disc 27 is arranged between floating cylinder 14″ and disc valve 9 without exerting an pressure on disc valve 9, and a very weak spring 28 biases disc 27 into engagement with valve 9 without exerting any pressure on this valve.

Disc valve 9 has characteristic suitable for the secondary vibrations in the case of high frequencies, but it has an increased characteristic suitable for the primary vibrations by the additional disc 27 in the case of low frequencies.

The embodiment of FIG. 9b further includes a releasing valve 29 in the manner described in connection with the embodiment of FIG. 12. In the operative stroke of the oil damper, the oil pressure pushes valve 29 downwardly to close radial port or ports 30. In the inoperative stroke of the oil damper, as the oil pressure becomes zero, valve 29 opens port or ports 30, under the bias of spring 31, so that floating cylinder 14″ is restored to its original position rapidly. The throttle duct in this case is the radial port 18.

Figure 16:
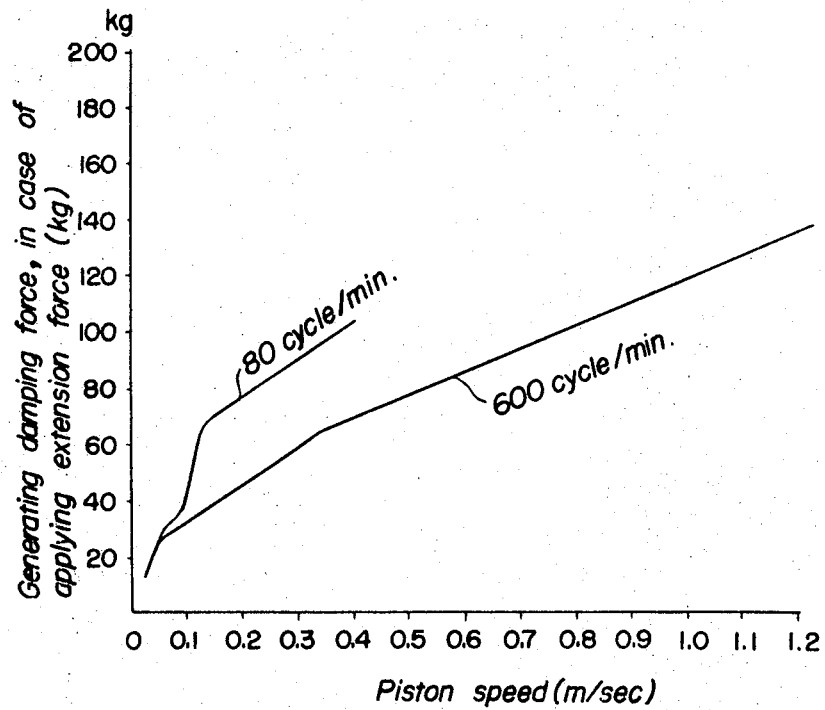
FIG. 16 is a diagram graphically illustrating the damping characteristics of the embodiments shown in FIGS. 12 through 15.

FIG. 16 graphically illustrates the relation between the generated damping force and the piston speed in the case of the embodiments of the invention shown in FIGS. 12 and 14, at two different frequencies. The 80 cycle frequency represents the primary vibration and the 600 cycle frequency represents the secondary vibrations.

In summary, it will be apparent that the invention provides a shock absorber of the oil damper type which obviates the problem of accommodating both the primary and secondary vibrations with a single unit, and that the shock absorber embodying the invention insures increased riding comfort under all conditions.

While specific embodiments of the invention have been shown and described in detail to illustrate the application of the principles of the invention, it will be understood that the invention may be embodied otherwise without departing from such principles.

I claim:

1. A shock absorber of the oil damper type, for use in automotive vehicles having bodies supported on axles through springs, and capable of damping efficiently both the natural low frequency primary vibrations occurring above the springs and the natural high frequency secondary vibrations occurring beneath the springs, said shock absorber comprising, in combination, a cylinder element; a piston element slidable in said cylinder element, one element being constructed for connection to a vehicle axle and the other element being constructed for connection to a vehicle body; two pressure control valves each mounted on one of said elements; one of said valves constituting a primary valve having high damping characteristics effective to dampen said primary vibrations, and the other of said valves constituting a secondary valve having lower damping characteristics effective to dampen said secondary vibrations; and frequency responsive switching means operatively associated with said secondary valve and operable, responsive to occurrence of said primary vibrations, to render said secondary valve ineffective and operable, responsive to termination of said primary vibrations, to render said secondary valve effective again; said piston element comprising a piston rod formed with an axial duct therein opening into said high pressure chamber, at one end, and opening through a piston, on said piston rod, at the other end; a transverse duct in said piston rod connecting said axial duct to one of said pressure control valves; said switching means comprising a switch valve mechanism including a plungerlike valve member having a sliding fit in said axial duct and movable therealong to open and close said transverse duct; said plungerlike valve member including a pushup piston at its lower end slidable in a cylinder; said valve member being formed with an axial working fluid passage for maintaining communication between said high pressure chamber and a chamber beneath said pushup piston; a working fluid chamber above said pushup piston having a working fluid discharge port; said valve member being formed with a duct for introducing fluid to said pushup piston; either said discharge port or said introducing duct serving to throttle the flow of working fluid; a biasing spring urging said pushup piston to a position in which said plungerlike valve member opens said transverse duct; whereby said one pressure control valve is opened by the throttling effect when a change in the pressure in said high pressure chamber is caused by external forces of higher frequency, and said plungerlike valve member is moved upwardly to close said transverse duct when the change in in the pressure in said high pressure chamber is caused by external forces of low frequencies.

2. A shock absorber of the oil damper type, for use on automotive vehicles having bodies supported on axles through springs, and capable of damping efficiently both the natural low frequency primary vibrations occurring above the springs and the natural high frequency secondary vibrations occurring beneath the springs, said shock absorber comprising, in combination, a cylinder element; a piston element slidable in said cylinder element, one element being constructed for connection to a vehicle axle and the other element being constructed for connection to a vehicle body; tow pressure control valves each mounted on one of said elements; one of said valves constituting a primary valve having high damping characteristics effective to dampen said primary vibrations, and the other of said valves constituting a secondary valve having lower damping characteristics effective to dampen said secondary vibrations; said piston element comprising a piston rod formed with an axial duct and transverse passage means therein opening into the chamber above said piston element at one end and opening to said secondary valve at the other end; hydraulically operated switch valve means movable by the pressure fluid in said cylinder element above said piston element and controlling the connection of said secondary valve to said axial duct and transverse passage means; said hydraulically operated switch valve means having an inlet passage communicating with said cylinder element above said piston element and having a discharge port for the working fluid; one of said inlet passage and said discharge port operating to throttle the flow of the working fluid, whereby said hydraulically operated switch valve means moves with a time lag; and a spring biasing said hydraulically operated switch valve means to a position in which it establishes communication between said duct and said transverse passage means and said secondary valve; whereby said hydraulically operated switch valve means establishes communication between said secondary valve and said duct and transverse passage means when a change in the pressure of the working fluid is generated by external forces of higher frequency, and interrupts communication between said secondary valve and said duct and transverse passage means when a change in the pressure of the working fluid is generated by external forces of lower frequency.

3. A shock absorber of the oil damper type, as claimed in claim 2, in which said primary valve is operable to dampen secondary vibrations at higher relative speeds of said piston and cylinder elements.

4. A shock absorber of the oil damper type, as claimed in claim 2, in which said shock absorber is a dual acting oil damper developing damping forces in both the compression and extension strokes thereof.

5. A shock absorber of the oil damper type, as claimed in claim 2, in which said low frequency primary vibrations have frequencies of from 40 to 120 cycles per minute, and said high frequency secondary vibrations have frequencies of from 400 to 1000 cycles per minute.